(12) United States Patent
Childers et al.

(10) Patent No.: US 12,704,144 B1
(45) Date of Patent: Aug. 11, 2026

(54) FASTENER WITH CLUTCH MECHANISM AND FASTENER OPERATING METHOD

(71) Applicant: Centrix AeroSpace LLC, Kent, WA (US)

(72) Inventors: Kelly Childers, Kent, WA (US); Cameron Ralphs, Kent, WA (US)

(73) Assignee: CENTRIX AEROSPACE LLC, Kent, WA (US)

( * ) Notice: Subject to any disclaimer, the term of this patent is extended or adjusted under 35 U.S.C. 154(b) by 0 days.

(21) Appl. No.: 19/177,334

(22) Filed: Apr. 11, 2025

(51) Int. Cl.
*F16B 31/02* (2006.01)
*B23P 19/00* (2006.01)

(52) U.S. Cl.
CPC .............. *F16B 31/02* (2013.01); *B23P 19/00* (2013.01)

(58) Field of Classification Search
CPC ........ F16B 31/02; F16B 31/00; F16B 35/045; F16B 35/044; F16B 35/041; F16B 35/04; F16B 35/00; B23P 19/00
USPC ......................... 29/525.02, 525.01, 428, 592
See application file for complete search history.

(56) References Cited

U.S. PATENT DOCUMENTS

| | | | | |
|---|---|---|---|---|
| 2,234,022 A * | 3/1941 | Churchill | H01R 11/15 | 439/803 |
| 2,765,059 A * | 10/1956 | Amtsberg | F16D 43/2024 | 192/56.53 |
| 5,431,660 A * | 7/1995 | Burke | A61B 17/8685 | 411/536 |
| 2006/0070222 A1* | 4/2006 | Clew | B21J 15/025 | 29/524.1 |
| 2010/0327505 A1* | 12/2010 | Pratt | F16B 13/0858 | 269/48.1 |
| 2011/0014004 A1* | 1/2011 | Yasui | F16B 39/02 | 411/1 |
| 2013/0056236 A1* | 3/2013 | Morinishi | B25B 23/14 | 173/176 |
| 2023/0200950 A1* | 6/2023 | Kofford | A61C 8/0069 | 433/173 |

* cited by examiner

*Primary Examiner* — Lawrence Averick
(74) *Attorney, Agent, or Firm* — McCoy Russell LLP

(57) ABSTRACT

A system and method for a fastener. The fastener, in one example, includes a clutch mechanism configured to transition to a disengaged configuration responsive to a clamping force of the fastener exceeding a threshold value. The clutch mechanism includes a drive nut that is configured to mate with a head of a screw in an engaged configuration and a spring configured to interact with the screw head and where in the disengaged configuration of the clutch mechanism, rotation of the drive nut in a first direction does not induce rotation of the screw and rotation of the drive nut in a second direction induces rotation of the screw in an unclamping direction.

11 Claims, 13 Drawing Sheets

190
100
500
502
199
400
402
126
z
y
x 100
199
404
400
404
402
z
y
x 106
100
199
400
402
144
140
110
z
y
x 106
100
122
199
400
145
402
110
z
y
x 100
199
400
402
142
z
y
x 100
126
106
H
199
H
y
x
z 1000
100
134
1208
K
110
L
115
122
J
1002
120
199
106
162
1003
126
148
128
146
118
116
1006
1004
1001

140
199
110
136

1206
1204
122
138
110
1205
199
1202
1200
126
148
146
134
1000
150

122
146
1300
199
110
1301
118
115
1302
116
1304
156

100
126
199
E
E
y
x
z 100
126
132
G
110
H
R
F 199
106
1500
1000
R 126
199
110

110
199
126
1000
132

1801
1800
106
1802
162
199
110
116
156
108

199
106
1902
108
162
1900

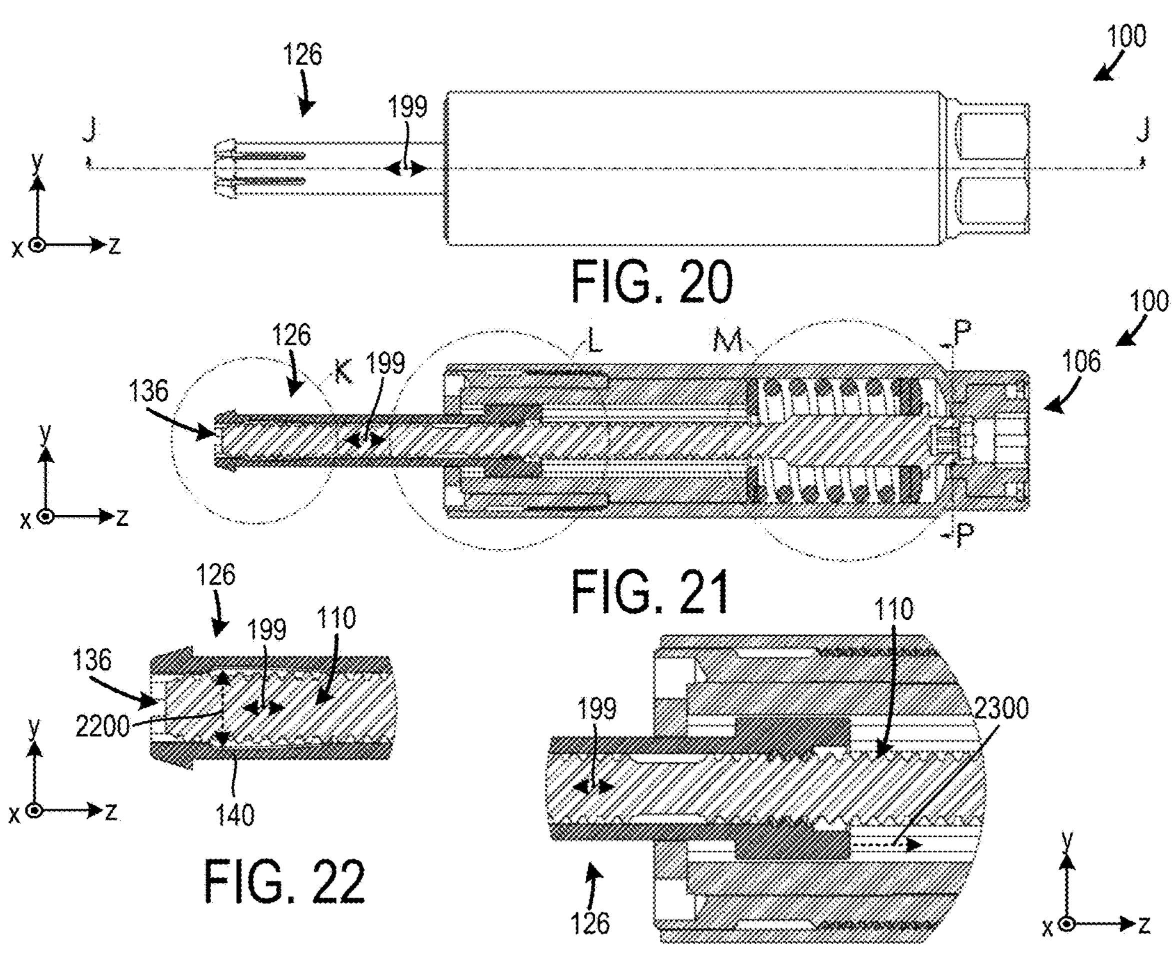
FIG. 20
FIG. 21
FIG. 22
FIG. 23
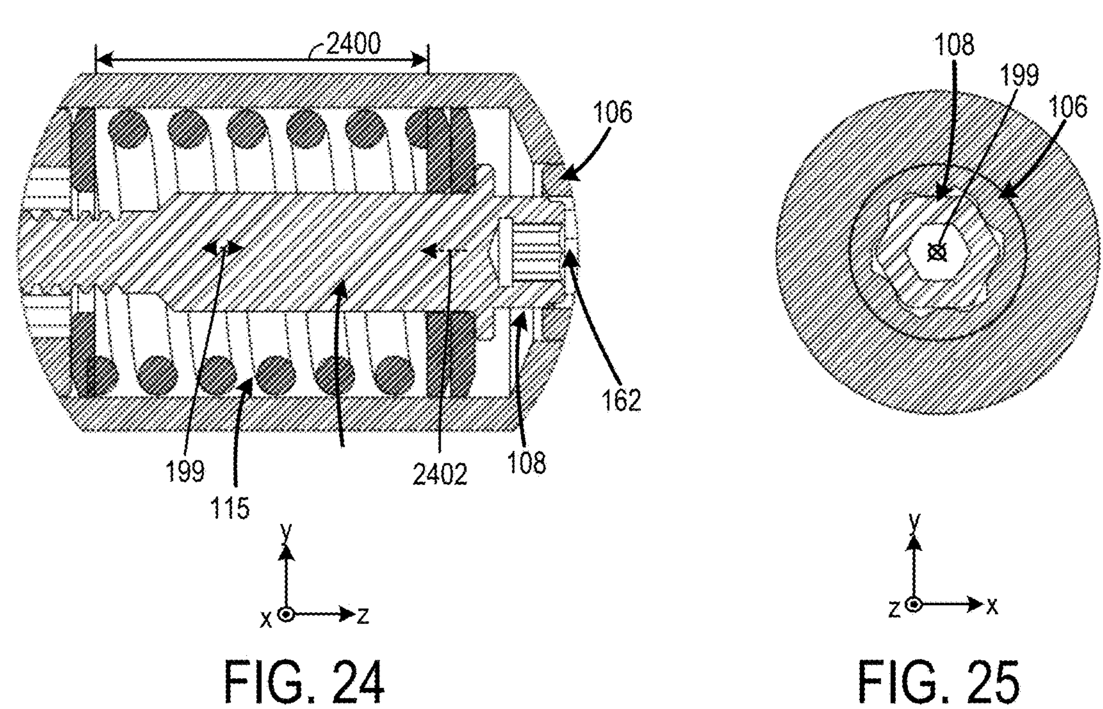
FIG. 24
FIG. 25

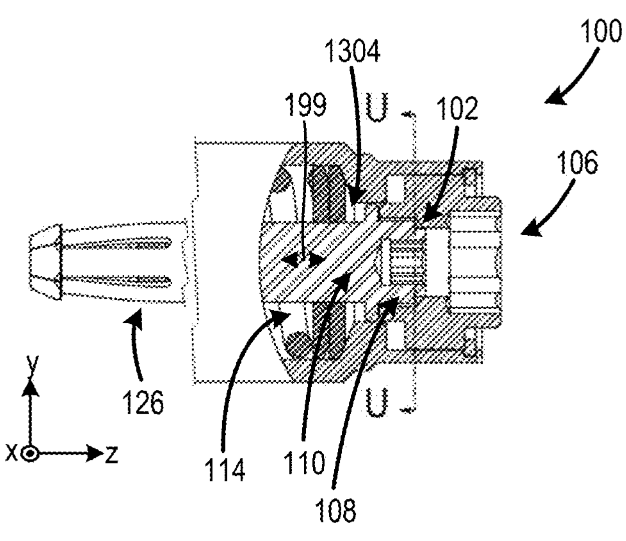
FIG. 26
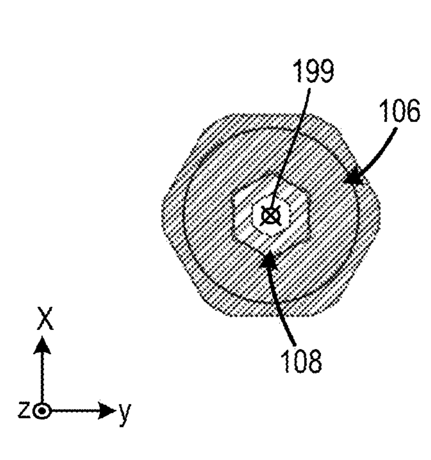
FIG. 27
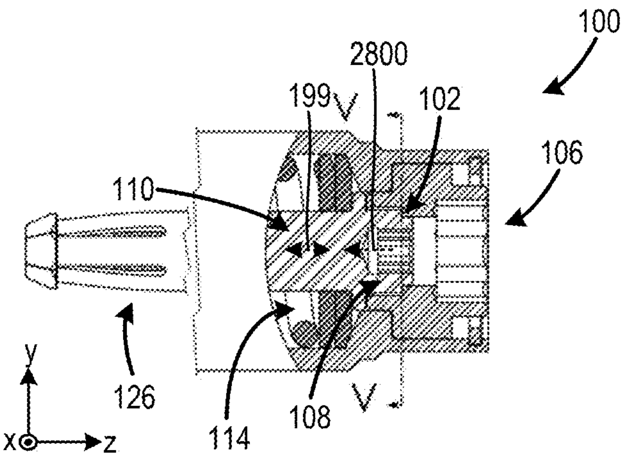
FIG. 28
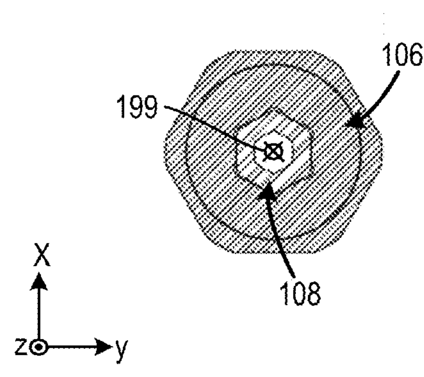
FIG. 29
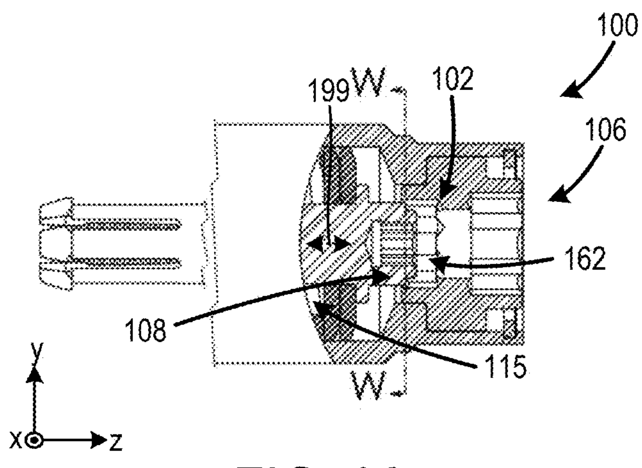
FIG. 30
199
106
X
z
y
FIG. 31

106
199
X
z
y 106
199
z
x
y 106
199
X
z
y 106
112
199
z
x
y
3504
162
3503
3506
3508
3510
3502

106
z
y
x
199
3502

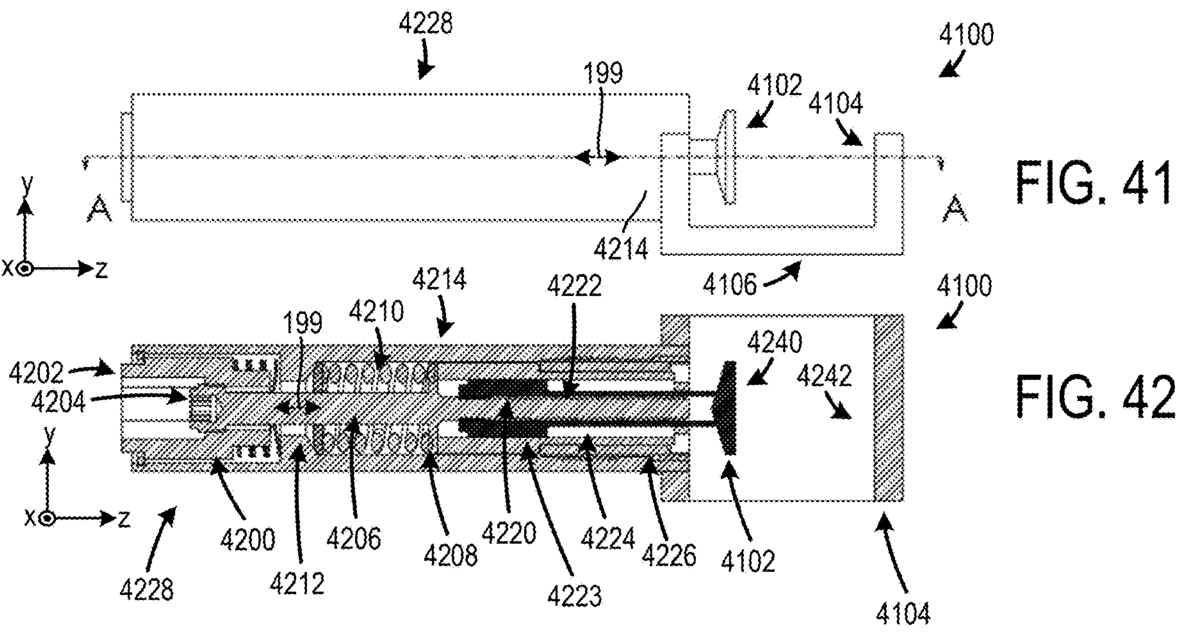
4228
199
4102
4104
4100
A
A
FIG. 41
4214
4106
y
x
z
4214
4210
199
4222
4100
4202
4204
4240
4242
FIG. 42
4228
4200
4212
4206
4208
4220
4223
4224
4226
4102
4104
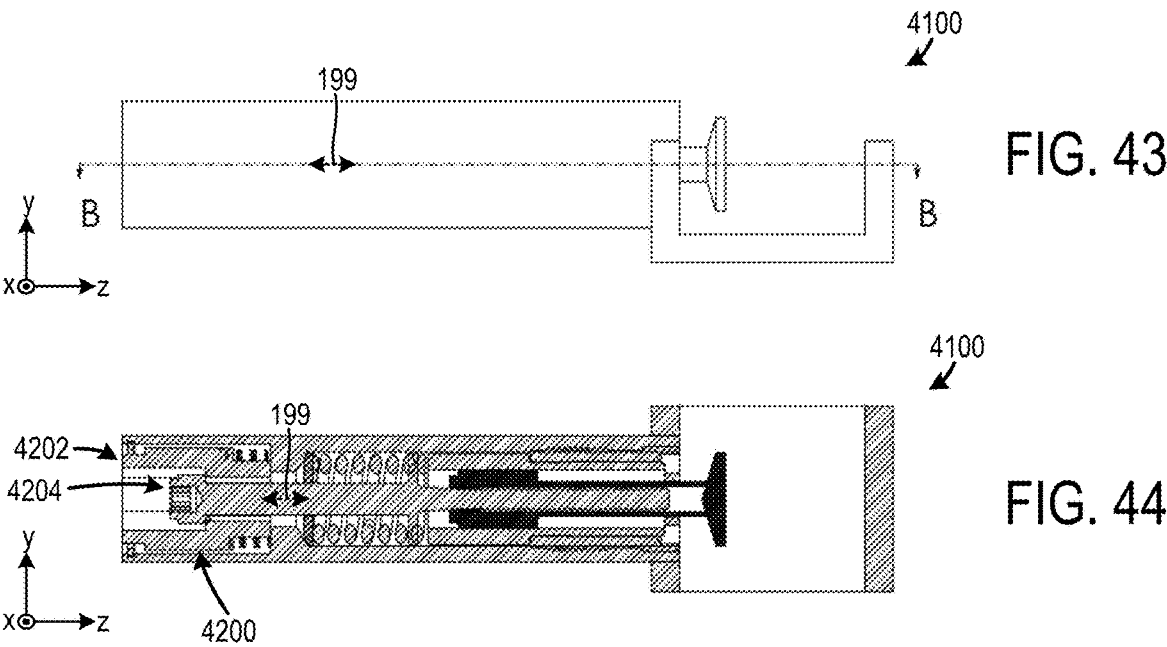
4100
199
FIG. 43
B
B
y
x
z
4100
4202
199
4204
FIG. 44
4200

FASTENER WITH CLUTCH MECHANISM AND FASTENER OPERATING METHOD

FIELD

The present description relates generally to a fastener with a clutch mechanism that functions to disengage clamping input when a target clamp force is reached.

BACKGROUND AND SUMMARY

Many manufacturing fields use fasteners for securing multiple work pieces to one another. Fasteners have been used in industries, such as the aerospace industry, to secure floor panels to underlying floor beams, in some use cases. In other aerospace industry use cases, fasteners have been used to attach wing components, fuselage components, pylons, etc., to increase manufacturing adaptability. Previous temporary fasteners have included a screw which interacts with a collet device to expand clamping components in the collet device. When expanded, the clamping components act as a clamping arm or surface to enable axial clamping of a workpiece stack.

Some manufacturing processes utilize controlled torque input for clamping fasteners. Torque control tooling often results in variable clamp loads especially at low loads. For this reason, it is desirable to use a more controlled clamping process. For instance, certain production environments use a manual clamping procedure that involves spring displacement to finely control clamping force. The inventors have recognized that this type of manual clamping process is time consuming, tedious, and unreliable.

Facing the aforementioned challenges, the inventors developed a fastener to at least partially overcome the challenges. The fastener includes, in one example, a clutch mechanism that is configured to transition to a disengaged configuration responsive to a clamping force of the fastener exceeding a threshold value. The clutch mechanism includes a drive nut that is configured to mate with a head of a screw in an engaged configuration. The clutch mechanism further includes a spring configured to interact with the screw head. Further, in the disengaged configuration of the clutch mechanism, rotation of the drive nut in a first direction does not induce rotation of the screw and rotation of the drive nut in a second direction induces rotation of the screw in an unclamping direction. In this way, the clamping force of the fastener is mechanically constrained. As such, controlled torque input for the fastener may be avoided, if desired. To elaborate, the fastener cannot be tightened above a target clamp force, regardless of input torque or speed. In this way, the fastener is able to reliably reach a target clamp force even in production environments that manually clamp the fastener.

Further, in one example, the drive nut may include ramps with angled surface that are configured to slip off of the head of the screw when the head compresses the spring in the clutch mechanism by a threshold amount. In this way, the clutch mechanism space efficiently achieves disengagement functionality when the fastener reaches the target clamp force. It will be understood that the target clamp force may be selected based on end-use design goals and the spring constant and/or spring pre-load may be adjusted to achieve this target value.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 20 is a side view of the fastener, depicted in FIG. 1, in a clamping configuration.

FIGS. 21-25 are cross-sectional views of the fastener, depicted in FIG. 20.

FIGS. 26-31 show a clamping sequence of the fastener, depicted in FIG. 1.

FIGS. 41-44 are different views of yet another example of a fastener.

DETAILED DESCRIPTION

A fastener is described herein that is designed to mechanically limit fastener clamping force in the absence of controlled torque input. However, it will be appreciated that the fasteners described herein may be used with controlled torque tooling. Specifically, the fasteners described herein cannot be tightened above a "target" clamp force, regardless of input torque or speed. As such, manufacturing processes that employ the fasteners described herein experience increased repeatability and reliability. To achieve the above-mentioned functionality, the fasteners include a clutch/drive mechanism that functions as the input of the fastener and enables the fastener to be designed with a maximum clamp force. The clutch mechanism has a drive nut that may include ramps that slip off a head of a screw when a spring is compressed by a threshold amount in response to rotation of the drive nut in the clamping direction. It will be understood that the spring compression correlates to the clamping force exerted by the fastener on a workpiece stack. To elaborate when the drive nut is rotated in a clamping direction the drive nut slips off the screw head, and when the drive nut is rotated in an unclamping direction, the drive nut engages the screw head to reduce the clamping force of the fastener thereby enabling fastener unclamping. In this way, the drive nut connection to the screw becomes directional, expanding the fastener's functionality and increasing the clamping reliability and consistency of the fastener. The clutch mechanism may be configured as a drive nut without ramps that engages a screw in the install direction. In this clutch mechanism example, the screw will compress the spring, providing clamp force, until it disengages with the drive nut, making it impossible to further increase the clamp force. In order to uninstall the fastener with the drive nut that does not have ramps, one can directly access the screw through the drive nut and unwind it directly releasing the clamp and repositioning the fastener and drive nut in the install direction. The fasteners described herein may also include a free-spin feature where the screw is disengaged from a collet body when the screw is rotated in an unclamping direction beyond a threshold. This free-spin feature prevents the fastener from unwinding beyond an amount that degrades the fastener. A second free-spin feature may also be included to prevent the fastener from winding forward beyond an amount that degrades the fastener.

Figure 1:
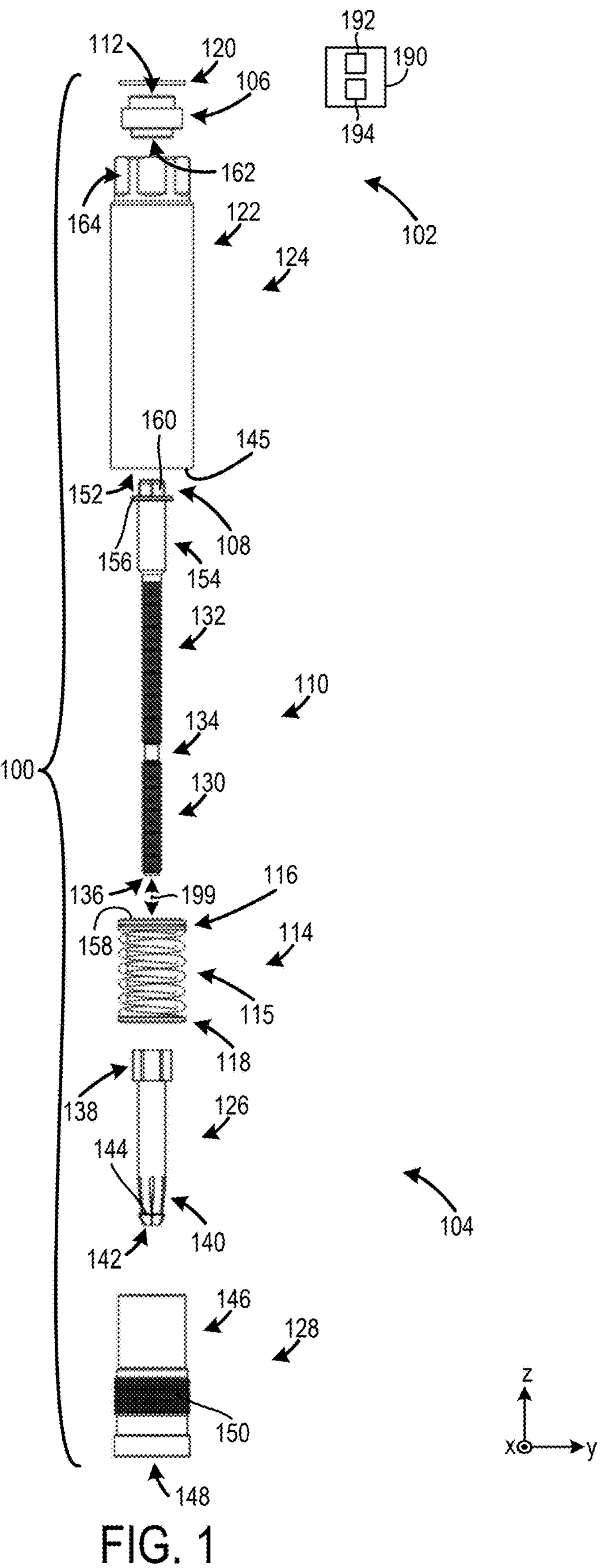
FIG. 1 is an exploded view of an example of a fastener.

FIG. 1 shows a first example of a fastener 100 in an exploded view. Thus, the fastener is in a disassembled configuration in FIG. 1. The fastener 100 includes a clutch mechanism 102 and a clamping assembly 104, in the illustrated example. The clutch mechanism 102 functions to drive clamping and unclamping of the fastener 100 as well as constrain the fastener's maximum clamping force. As such, the chance of workpiece degradation from fastener over-torqueing is decreased (e.g., avoided), thereby increasing customer satisfaction.

The clutch mechanism 102 includes a drive nut 106 that mates with a head 108 of a screw 110 when the clutch is in an engaged state. Conversely, when the clutch mechanism 102 is in a disengaged state, the drive nut 106 slips off of the screw head 108 when the drive nut 106 is rotated in a clamping direction. However, it will be understood that when the drive nut 106 is rotated in an unclamping direction the screw 110 is correspondingly rotated in an unclamping direction when the clutch is in an engaged state as well as a disengaged state. The drive nut 106 includes direction ramps that enable this functionality as elaborated upon herein.

In the illustrated example, the drive nut 106 includes a drive interface 112 that is configured to interact with a tooling apparatus 190 which induces rotation of the drive nut 106 in opposing rotational directions to clamp and unclamp the fastener. As such, one of the rotational input directions may be referred to as a clamping direction and the other rotational input direction may be referred to as an unclamping direction. The drive interface 112 is illustrated as a polygonal recess, however numerous suitable types of drive interfaces for the drive nut are possible.

The clutch mechanism 102 further includes a spring and washer/shim assembly 114 with a spring 115 as well as washers/shims 116 and 118, in the illustrated example. Alternatively, the shims/washers or a portion of the shims and/or washers may be removed or added from the clutch mechanism, in alternate embodiments. Washers/shims 116 and 118 are positioned above and below the spring 115, respectively, to axially delimit the spring and allow for target load adjustment and calibration. In this way, the washers/shims 116 and 118 (e.g., upper and lower washers/shims) may be used in the clutch mechanism 102 to alter the fastener's target clamping threshold, which is expanded upon below. The clutch mechanism 102 may further include a retaining ring 120 (e.g., a snap ring) that mates with a body 122 of a housing 124.

The spring 115 is a helical spring in the illustrated example. However, additional or alternative types of springs may be used in the fastener, in other examples. For instance, the spring may include a wave-type spring, one or more Belleville spring washers, and/or an elastic polymer compound (e.g., a polymer spring).

The clamping assembly 104 may include the housing 124 and a collet body 126. The housing 124 additionally includes a plug and cap assembly 128, discussed in greater detail below. The screw 110 includes multiple threaded sections 130 and 132 as well as a reduced diameter section (e.g., an unthreaded section) 134 between the threaded sections, in the illustrated example. Further, in the illustrated example, the threaded section 130 extends to a distal end 136 of the screw 110. In another example, the distal end of the screw may have a curved profile (e.g., domed profile), a planar profile, and the like. However, other screw designs have been contemplated. In the illustrated example, the reduced diameter section 134 may have a smaller diameter than the threaded sections 130 and 132. Alternatively, a reduced diameter section that is threaded may be axially positioned between the threaded sections 130 and 132. Even further in other examples, the unthreaded section or reduced diameter section may be omitted from the fastener 100. The reduced diameter section 134 allows the fastener 100 to achieve free-spin functionality. To elaborate, the axial position of the reduced diameter section 134 may be dependent on a forward position (e.g., fully forward position) of the collet body 126 where the collet body head is in contact with the threaded cap and cannot extend any further. In the free-spin position, a threaded section 1000 (shown in FIG. 10) of the collet body 126 aligns with the reduced diameter section 134 of the screw 110 and the screw freely spins with regard to the collet body, thereby inhibit further threaded engagement between the collet body and the screw. To initiate clamping after free-spin, an axially downward force and winding torque are applied to the screw to re-engage the threads in the screw 110 with the threads in the collet body 126. In an alternate example, the screw may include a smaller diameter threaded section positioned below a larger diameter threaded section. In another alternate example, the free-spin feature may be omitted from the fastener.

Figures 46, 47:
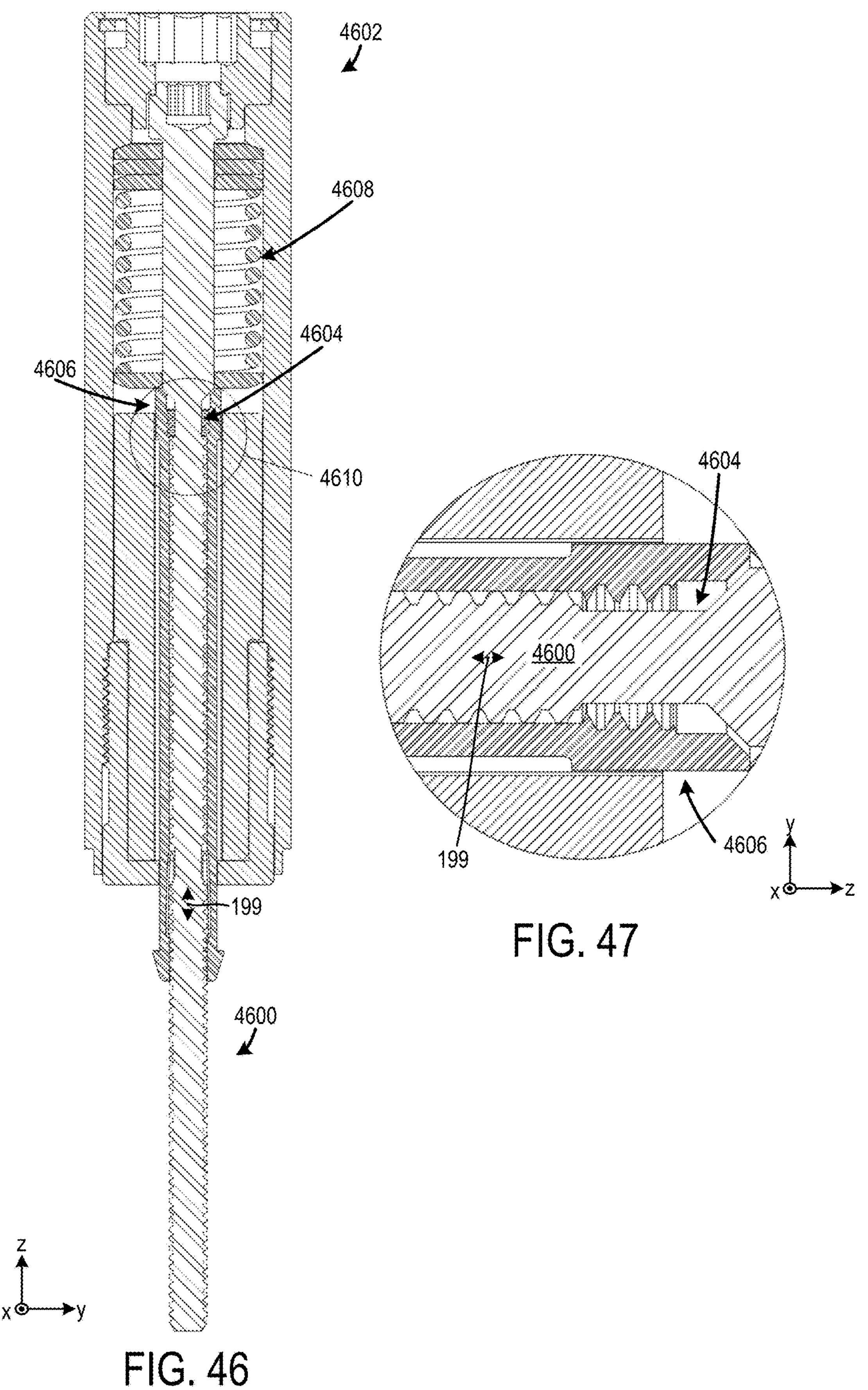
FIGS. 46-47 show another example of a fastener with multiple reduced diameter sections of a screw.

Alternatively, as shown in FIGS. 46-47, a screw 4600 in a fastener 4602 may have an additional reduced diameter section 4604 (e.g. an additional unthreaded section). In other examples, the additional reduced diameter section of the screw may be omitted from the fastener. As shown in FIGS. 46-47, when the screw 4600 of the fastener 4602 is engaged with the collet body 4606 and actuated to the point that the collet body reaches its maximum allowable height it may disengage with the screw thread by aligning axially with the reduced diameter section 4604. This will prevent the collet body from being pulled out of the plug and cap assembly. Pressure from a coiled spring 4608 will allow reengagement of the collet body 4606 and screw 4600. The location of the detailed cross-sectional view depicted in FIG. 47 is indicated at 4610 in FIG. 46.

In the example illustrated in FIG. 1, the collet body 126 includes a crown 138 and multiple cantilever legs 140 that extend therefrom. Each of the legs 140 include a foot 142 with a clamping surface 144. Thus, the feet function as a lower clamping arm or surface when the fastener is transitioned into a clamping configuration which is discussed in greater detail herein. In the illustrated example, a lower surface 145 of the housing body 122 functions as the upper clamping arm or surface in the fastener. However, other fastener configurations are possible as discussed is greater detail herein with regard to FIGS. 37-44. Specifically, in other examples, the collet body may include a fewer or greater number of cantilever legs (e.g., a single cantilever leg, two cantilever legs, greater than three cantilever legs, etc.) or a different lower clamping arm configuration, as discussed in greater detail herein with regard to FIGS. 37-44.

As shown in FIG. 1, the housing 124 includes the body 122 and the plug and cap assembly 128 with a plug 146 and a cap 148. Thus, the plug and cap assembly 128 may be formed via multiple parts that are press-fit and/or otherwise coupled to one another. However, in another example, the plug and cap assembly may be formed as a single piece.

The plug and cap assembly 128 includes a threaded section 150 that is profiled to engage a threaded section in a bore 152 of the housing body 122. The plug and cap assembly 128 allows the spring and washer/shim assembly 114 to be incorporated into the housing body 122. To elaborate, during fastener assembly the spring and washer/shim assembly 114 may be inserted into the housing body 122 and the plug and cap assembly 128 may then be threaded or otherwise coupled (e.g., press-fit, welded, combinations thereof, and the like) to the housing body.

In the illustrated example, the collet body 126 includes the crown 138 that has a polygonal shape (e.g., hexagonal, octagonal, square, rectangular, and the like) that is profiled to mate with a polygonal recess in the plug 146. In this way, the collet body 126 axially translates without rotation as the screw is rotated. However, other anti-rotation profiles of the collet body and the plug are possible.

The screw 110 includes an upper section 154 that is arranged axially above the threaded section 132, in the illustrated example. The upper section 154 has a greater diameter than the threaded sections 130 and 132. The upper section 154 is not threaded in the illustrated example. However, other screw configurations are possible. The upper section 154 is profiled to mate with central openings in the washers/shims 116 and 118.

The screw 110 further includes the head 108 with a flange 156. The flange 156 is sized to contact an upper surface 158 of the washers/shims 116 to enable compression of the spring 115 during clamping. The head 108 includes a polygonal shaped section 160, in the illustrated example. To elaborate, the polygonal shaped section 160 may have a hexagonal profile, a rectangular profile, an octagonal profile, and the like in the x-y plane. As discussed in greater detail herein the head 108 is configured to mate with a recess 162 in the drive nut 106 when the fastener 100 is assembled. When the screw 110 is rotated the collet body 126 is drawn up or down by the threads in the screw depending on the direction of rotation of the screw.

The plug 146 includes an anti-rotation section (with regard to the collet body 126) in an interior as discussed in greater detail herein. Further, the plug and cap assembly 128 allows the spring 115 and washers/shims 116 and 118 to be inserted into the housing body 122. To elaborate, the spring and washers/shims may be inserted into an interior of the housing body 122 and the plug and cap assembly 128 may be subsequently threaded into the housing body 122 or otherwise coupled to the housing body, thereby axially delimiting the spring. The housing body 122 includes an external polygonal (e.g., hexagonal, rectangular, etc.) section 164 that functions as a tool interface for a tool such as an adapter socket and/or other suitable tools.

FIG. 1 further shows a tooling apparatus 190 (e.g., a robotic tooling machine which may be automated and/or a manual tooling device that may be manipulated via manufacturing personnel) that may be used to manipulate the fastener 100 (e.g., rotate the drive nut 106, hold the housing body 122, etc. for instance). The tooling apparatus 190, illustrated in FIG. 1, may include a processor 192 and memory 194 (e.g., non-transitory memory) storing instructions executable by the processor. The tooling apparatus 190 may further include tooling attachments, arms, carriages, and the like, for manipulating the fastener as well as performing other manufacturing operations. The other fasteners described herein may be manipulated using a similar tooling apparatus. In one example, the torque input of the tooling apparatus 190 may not be controllable.

An axis system is provided in FIG. 1 as well as FIGS. 2-44 and 46-47, for reference, when appropriate. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Further, a central axis 199 of the fastener 100 depicted in FIG. 1 as well as the fasteners depicted in FIGS. 2-44 and 46-47, for reference. Further, above and below as discussed herein may refer to relative proximal and distal positions in the fastener. However, it will be appreciated that the fastener's central axis may or may not be aligned with a gravitational axis in different installation orientations.

Figures 2, 3:
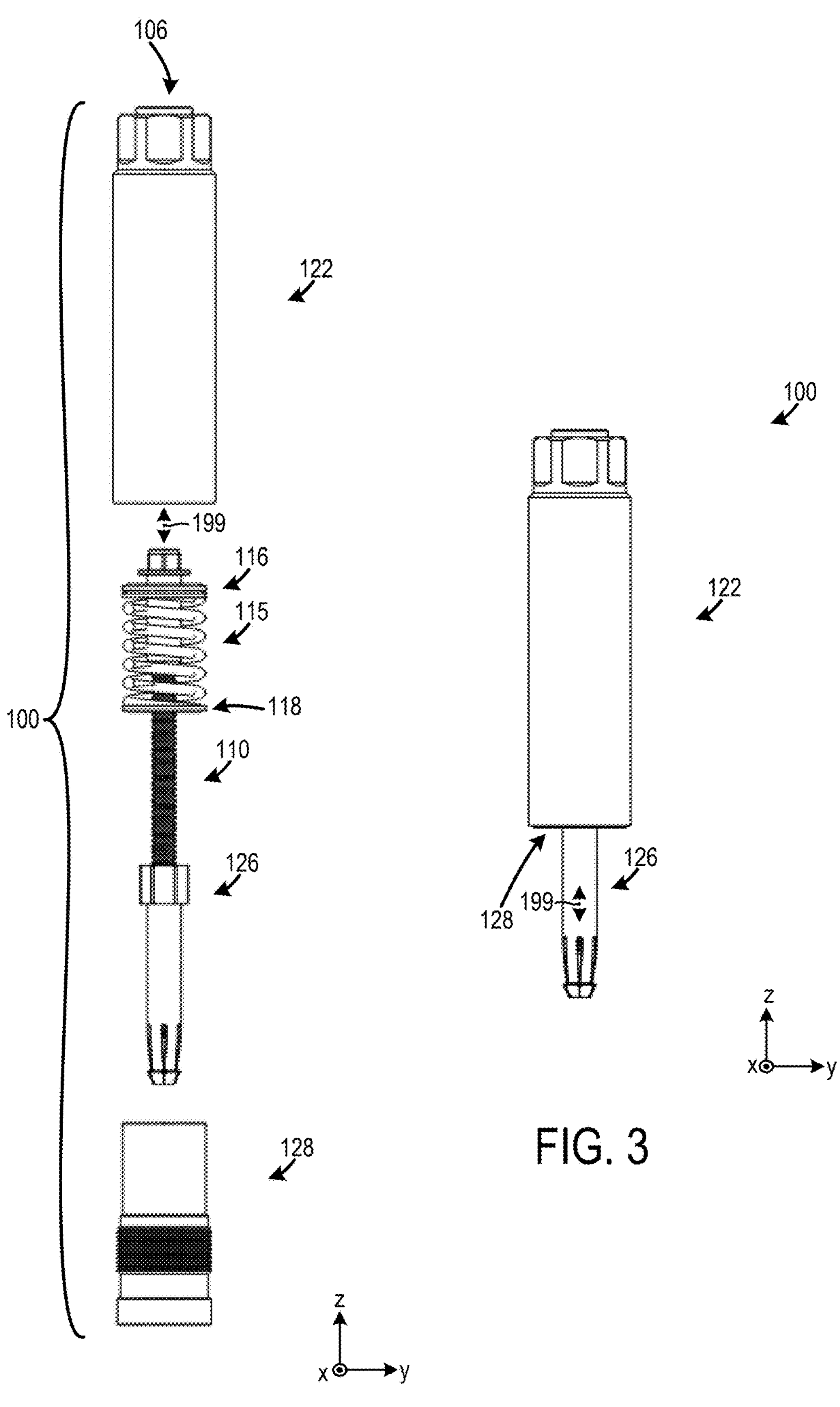
FIG. 2 is a partially assembled view of the fastener, depicted in FIG. 1.
FIG. 3 is a fully assembled view of the fastener, depicted in FIG. 1.

FIG. 2 shows the fastener 100 in a partially assembled configuration. To elaborate, in the partially assembled configuration, the screw 110 is threadingly engaged with the collet body 126 and the screw is mated with the spring 115 and the washers/shims 116 and 118. The plug and cap assembly 128, the housing body 122, and the collet body 126 are also depicted in FIG. 2.

FIG. 3 shows the fastener 100 in a fully assembled configuration where the assembly of the collet body 126, the screw 110, the 115, and the washers/shims 116 and 118 shown in FIG. 2 are inserted into the housing body 122 and then the plug and cap assembly 128 are attached to (e.g., threaded into) the housing body 122. Specifically, the fastener 100 is in an unclamped configuration in FIG. 3.

Figures 4, 5:
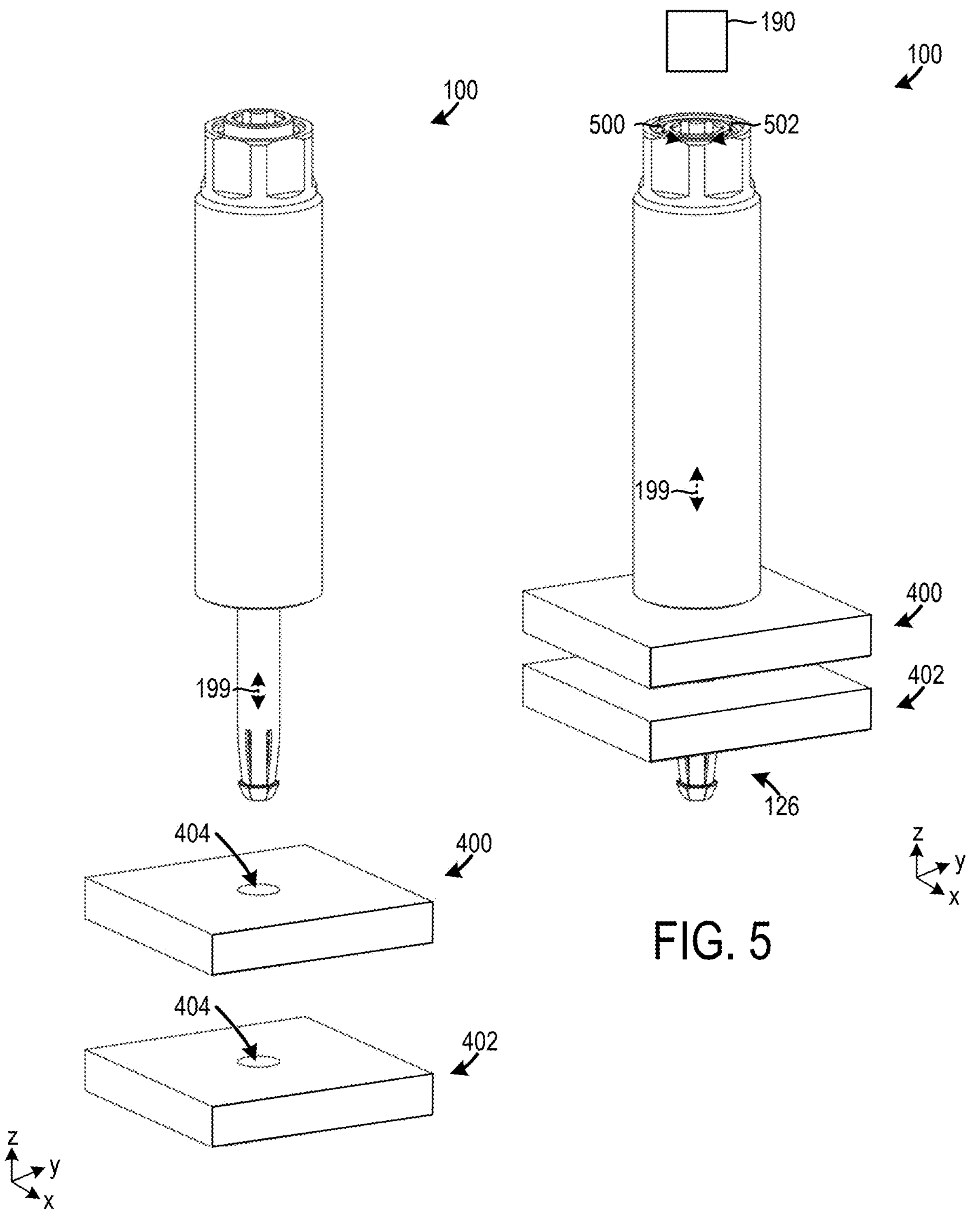
FIGS. 4-8 depict a workpiece clamping sequence for the fastener, depicted in FIG. 1.

FIGS. 4-8 show a clamping sequence for the fastener 100 where workpieces 400 and 402 are axially clamped via operation of the fastener. In FIG. 4, the fastener 100 is aligned with openings 404 in the workpieces 400 and 402. It will be understood that the workpieces 400 and 402 form a workpiece stack. Next in FIG. 5, the collet body 126 (in an unclamped configuration where the legs are radially retracted) is inserted into the workpiece openings 404, shown in FIG. 4. Rotational inputs (as indicated via arrows 500 and 502) for the drive nut 106 that are generated by the tooling apparatus 190 which induce fastener unclamping and clamping or vice versa are further depicted in FIG. 5. It will be understood that the tooling apparatus is configured to generate both inputs to any of the fasteners and fastener configurations described herein.

Figures 6, 7, 8:
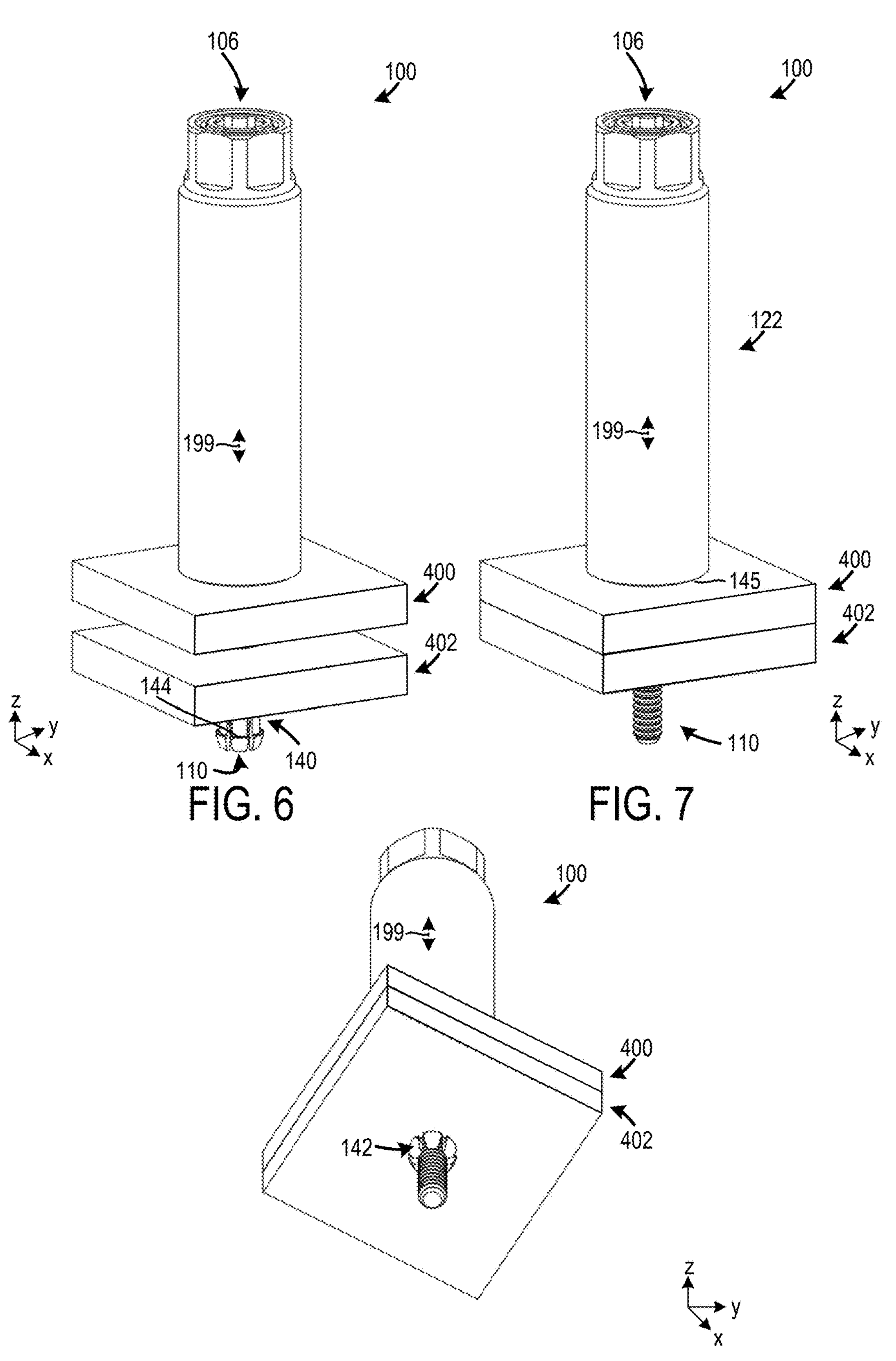

In FIG. 6, rotation of the drive nut 106 begins such that the collet body legs 140 are radially expanded by the screw 110 due to the collet body being drawn over the screw. Specifically in FIG. 6, the collet body legs are radially expanded to expose the clamping surfaces 144. However, in FIG. 6 the clamping surfaces 144 are spaced away from the lower workpiece.

In FIGS. 7-8, the drive nut 106 is further rotated to induce rotation of the screw 110 such that the fastener 100 reaches a target clamp force. It will be understood that when the fastener 100 is clamped the collet body 126 may be assumed to be in tension of magnitude equal to the clamp force if there are negligible internal losses (e.g., frictional losses) in the fastener. As discussed in greater detail herein, the drive nut 106 slips off of the head of the screw when the fastener reaches its maximum clamping force. FIG. 7 shows the surface 145 of the housing body 122 contacting the upper workpiece 400 and FIG. 8 specifically shows the feet 142 contacting the lower workpiece 402.

Figures 9, 10, 11, 12, 13:
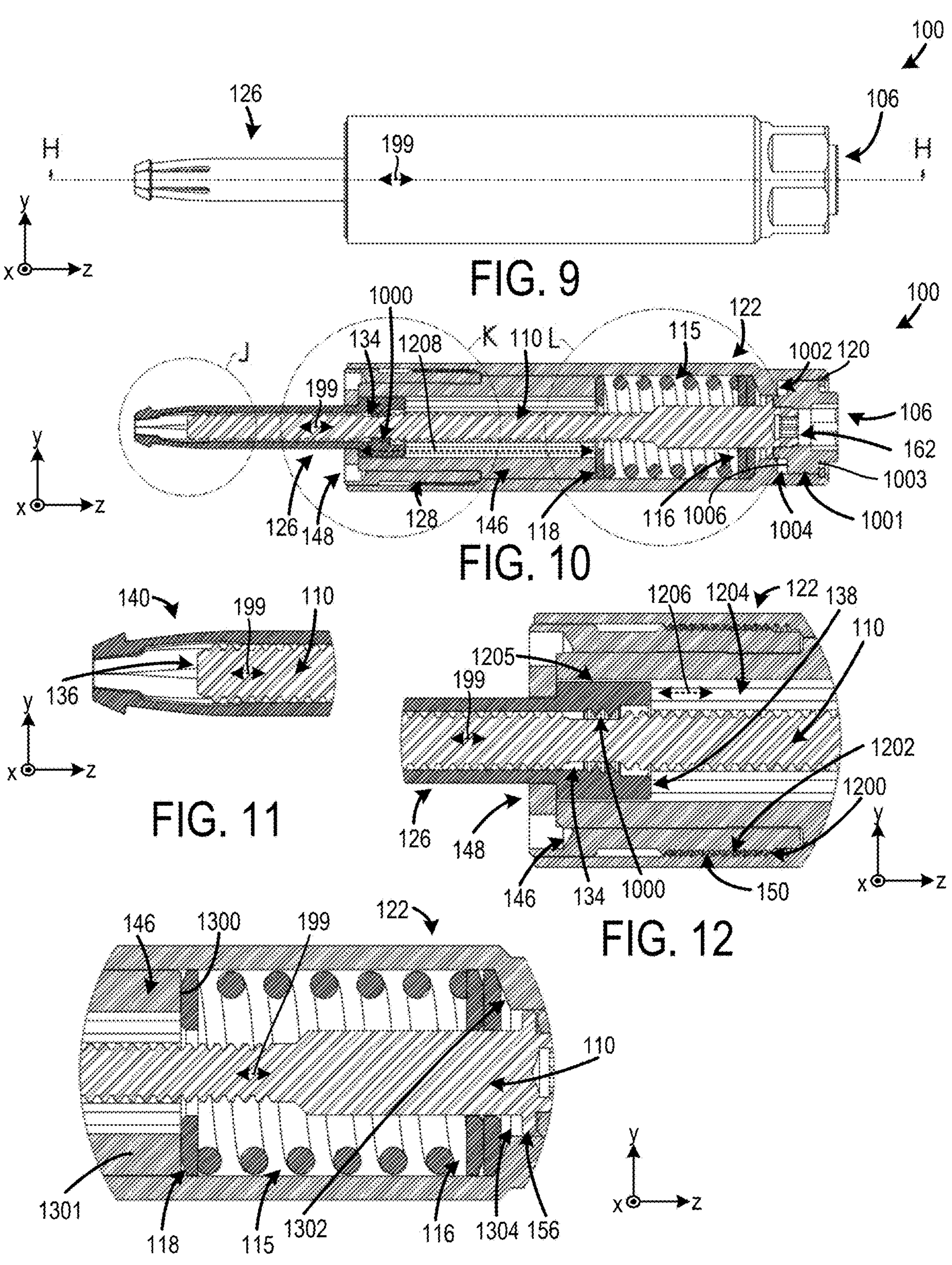
FIG. 9 is a side view of the fastener, depicted in FIG. 1, in a free-spin configuration.
FIGS. 10-13 are cross-sectional views of the fastener, depicted in FIG. 9.

FIG. 9 shows a side view of the fastener 100. As illustrated in FIG. 9, cutting plane H-H defines the cross-sectional view of the fastener 100 depicted in FIG. 10. The fastener 100 is in an unclamped configuration in FIG. 9.

As shown in FIG. 10, a flange 1001 of the drive nut 106 is axially delimited via the retaining ring 120 and a lower shelf 1002 in the housing body 122. Specifically, the drive nut 106 is allowed to axially move to transition the fastener into and out of the free-spin configuration. The fastener 100 is specifically in the free-spin configuration shown in FIG. 10 where the drive nut 106 is near or contacting the retaining ring 120 and an axial gap 1004 is formed between a lower surface 1006 of the flange 1001 of the drive nut 106 and the lower shelf 1002. Further, in the free-spin configuration, an upper surface 1003 of the drive nut flange 1001 contacts or is adjacent to the retaining ring 120.

Further, in the free-spin configuration shown in FIGS. 10 and 12 the reduced diameter section 134 of the screw 110 is aligned with the threaded section 1000 of the collet body 126. In this way, fastener degradation caused by unclamping the fastener beyond a target amount is avoided. To elaborate, in fasteners with hard-stops that omit the free spin-zone, when the hard-stop fasteners are unwound fully and the collet body is fully extended, the threaded connection will suddenly bind as further movement cannot occur. With enough torque, this binding will degrade the fastener's weak-points (e.g., the threads, the body, the cap, the screw, and/or the retaining ring).

Further, the head 108 of the screw 110 is mated with the recess 162 in the drive nut 106 in the example illustrated in FIG. 10. The washers/shims 116 and 118 are positioned on axially opposing sides of the spring 115 to provide spring preloading.

The cap 148 is shown threadingly engaged with the plug 146 to form the plug and cap assembly 128. The boundaries of the detailed view for FIGS. 11, 12, and 13 are indicated at J, K, and L in FIG. 10.

FIG. 11 shows the distal end 136 of the screw 110 positioned between the collet body legs 140 but not axially expanding the legs. As such, the fastener 100 is in an unclamped configuration in FIG. 11.

FIG. 12 shows the reduced diameter section 134 of the screw 110 aligned with threaded section 1000 the collet body 126. Further in the illustrated example, the threaded section 150 of the plug 146 forms a threaded interface 1200 with a threaded section 1202 of the housing body 122.

FIG. 12 further shows a polygonal bore 1204 in the plug 146 in which the collet body crown 138. In this way, an anti-rotation interface 1205 is formed within the fastener. Therefore, it will be understood that the collet body 126 axially translates within the bore 1204 in directions 1206 in response to drive nut rotation when the fastener is in the clamping configuration, as elaborated upon herein. FIG. 12 further shows the cap 148 axially delimiting the crown 138 of the collet body 126. An axial length 1208 of the bore 1204 is depicted in FIG. 10. The length of the bore 1204 allows the fastener to clamp workpieces of a variety of thicknesses.

FIG. 13 shows the lower washers/shims 118 in contact with an upper side 1300 of the plug 146 and the upper washers/shims 116 in contact with an upper section 1302 of the housing body 122. The upper side 1300 is included in an upper extension 1301 of the plug 146 that mates with an interior bore of the housing body 122. Further, the spring 115 is shown axially positioned between the upper washers/shims 116 and the lower washers/shims 118. Further, in the free-spin configuration shown in FIG. 13, a gap 1304 is formed between the flange 156 of the screw 110 and the upper washers/shims 116. Additionally, in the illustrated example, the outer diameters of the washers/shims 116 and 118 are less than the inner diameter of the internal bore of the housing body 122.

FIGS. 14-19 show the fastener 100 in a configuration where the screw 110 is threadingly engaged with the collet body 126 to place the fastener in a ready to clamp configuration where clamping operation is able to take place.

Figures 14, 15, 16, 17, 18, 19:
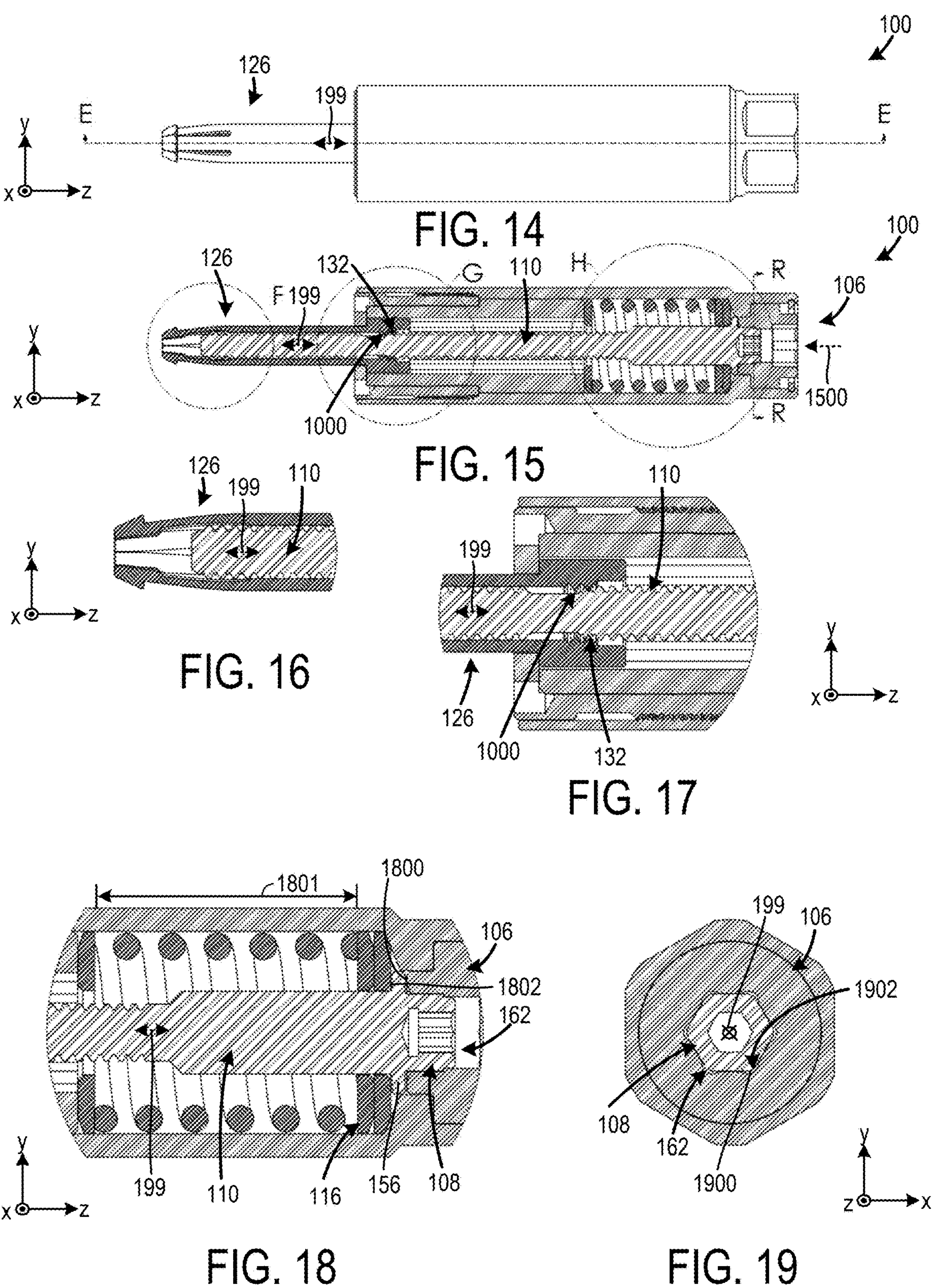
FIG. 14 is a side view of the fastener, depicted in FIG. 1, in a ready to clamp configuration.
FIGS. 15-19 are cross-sectional views of the fastener, depicted in FIG. 14.

As illustrated in FIG. 14, cutting plane E-E defines the cross-sectional view shown in FIG. 15 and cutting plane RR defines the cross-sectional view shown in FIG. 19. Further, as illustrated in FIG. 15, the boundaries of the detailed view for FIGS. 16, 17, and 18 are indicated at F, G, and H. Cutting plane R-R, illustrated in FIG. 15, defines the cross-sectional view depicted in FIG. 19.

Specifically, FIGS. 15 and 17 show the threaded section 132 of the screw 110 engaged with the threaded section 1000 of the collet body 126. To engage these threaded sections of the screw 110 and the collet body 126 a downward axial force is applied to the drive nut 106 as indicated at 1500 in FIG. 15.

Additionally, as shown in FIGS. 18 and 19 the head 108 of the screw 110 is mated with the recess 162 in the drive nut 106. Specifically, as shown in FIG. 19 the corners 1900 of the head of the screw 110 mate with recesses 1902 in the drive nut 106. Further, as shown in FIG. 18, the flange 156 of the screw head 108 is arranged adjacent to a lower surface 1800 of the drive nut 106 and an upper surface 1802 of the washers/shims 116.

FIGS. 20-25 show the fastener 100 in a clamping configuration where the legs 140 of the collet body 126 are radially expanded via the end 136 of the screw 110 (as indicated via arrows 2200 shown in FIG. 22). To elaborate, the screw 110 is rotated to draw the collet body 126 axially upward (indicated via arrow 2300 shown in FIG. 23) to decrease the grip length of the fastener 100.

As shown in FIGS. 24 and 25, the screw head 108 is disengaged from the drive nut 106 such that rotation of the drive nut in the clamping direction causes slipping between the drive nut 106 with regard to the screw 110 as opposed to torque transfer to the screw. Therefore, the screw head 108 is disengaged from the recess 162 of the drive nut 106 when the drive nut is rotated in the clamping direction. However, when the drive nut is rotated in the unclamping direction, the screw rotates to enable fastener unclamping. In this way, the fastener's maximum clamping force is constrained while allowing the fastener to be unclamped when the maximum torque is reached.

As the fastener clamp force increases, the tension in the screw increases and compresses the spring 115 as shown in FIG. 24 in comparison to FIG. 18. As such, the axial length 2400 of the spring 115 is less than the axial length 1801 of the spring 115 shown in FIG. 18. Tension in the screw is equal in magnitude to clamp force. Therefore, assuming a linear spring, spring displacement is proportional to clamp force and governed by Hooke's Law, $$x = \frac{F_s}{k},$$

where:

$F_s$ is the force produced by the spring (clamp force)

k is the spring constant (spring rate)

x is the spring displacement from free length

Once the spring/screw displace in direction 2402 indicated in FIG. 24 a fixed distance the clutch mechanism detaches the input from the screw. This point of detachment is designed to be the point at which spring force equals the desired "target clamp" force by selecting an appropriate spring rate and pre-compression. In other examples, a non-linear spring (e.g., Belleville washers) may be used within the fastener.

FIGS. 26-31 show an operational sequence of the fastener 100 where the drive nut 106 is torqued until the fastener reaches the maximum clamping force. FIG. 26 shows a cutting plane U-U that indicates the cross-sectional view depicted in FIG. 27, FIG. 28 shows a cutting plane V-V that indicates the cross-sectional view depicted in FIG. 29, and FIG. 30 shows a cutting plane W-W that indicates the cross-sectional view depicted in FIG. 31. The clutch mechanism 102 is engaged in FIGS. 26-29 and disengaged in FIGS. 30-31.

Specifically, FIGS. 26-27 show the drive nut 106 engaged with the screw head 108 and with an axial gap 1304 between the screw head flange 156 and the spring and washer/shim assembly 114 such that the screw 110 is in a free-spin configuration with regard to the collet body 126. FIGS. 26-27 additionally show the screw head 108 mated with the drive nut 106.

To initiate clamping operation in the fastener 100, as shown in FIGS. 28-29, the drive nut 106 is pressed axially downward and rotated to induce threaded engagement between the screw 110 and the collet body 126 and bring the screw head flange 156 into contact with the spring and washer/shim assembly 114. To elaborate, rotation of the screw 110 via the drive nut 106 causes fastener to clamp, compressing the spring 115 and moving the screw head 108 in axial direction 2800.

FIGS. 30 and 31 show the fastener 100 in a configuration where the clutch mechanism 102 is disengaged. To expound, after a fixed displacement of the spring 115, the drive nut 106 connection to screw 110 becomes uni-directional. In this configuration, the fastener cannot be clamped any further but can still be unclamped. In this way, the fastener is configured with a maximum clamping force to reduce the chance of workpiece damage. The maximum clamping force may be selected based on end-use specifications, thereby increasing customer satisfaction. As such, in the disengaged configuration of the clutch mechanism 102, the screw head 108 is axial moved out of mating engagement with the drive nut recess 162.

FIGS. 32-36 show different detailed views of the drive nut 106. The drive nut 106 includes the drive interface 112 in the form of a polygonal recess in the illustrated example. However, numerous configurations of the drive nut's tooling interface are possible. Cutting plane T-T, shown in FIG. 33, defines the cross-sectional view depicted in FIG. 36.

Figures 32, 33, 34, 35, 36:
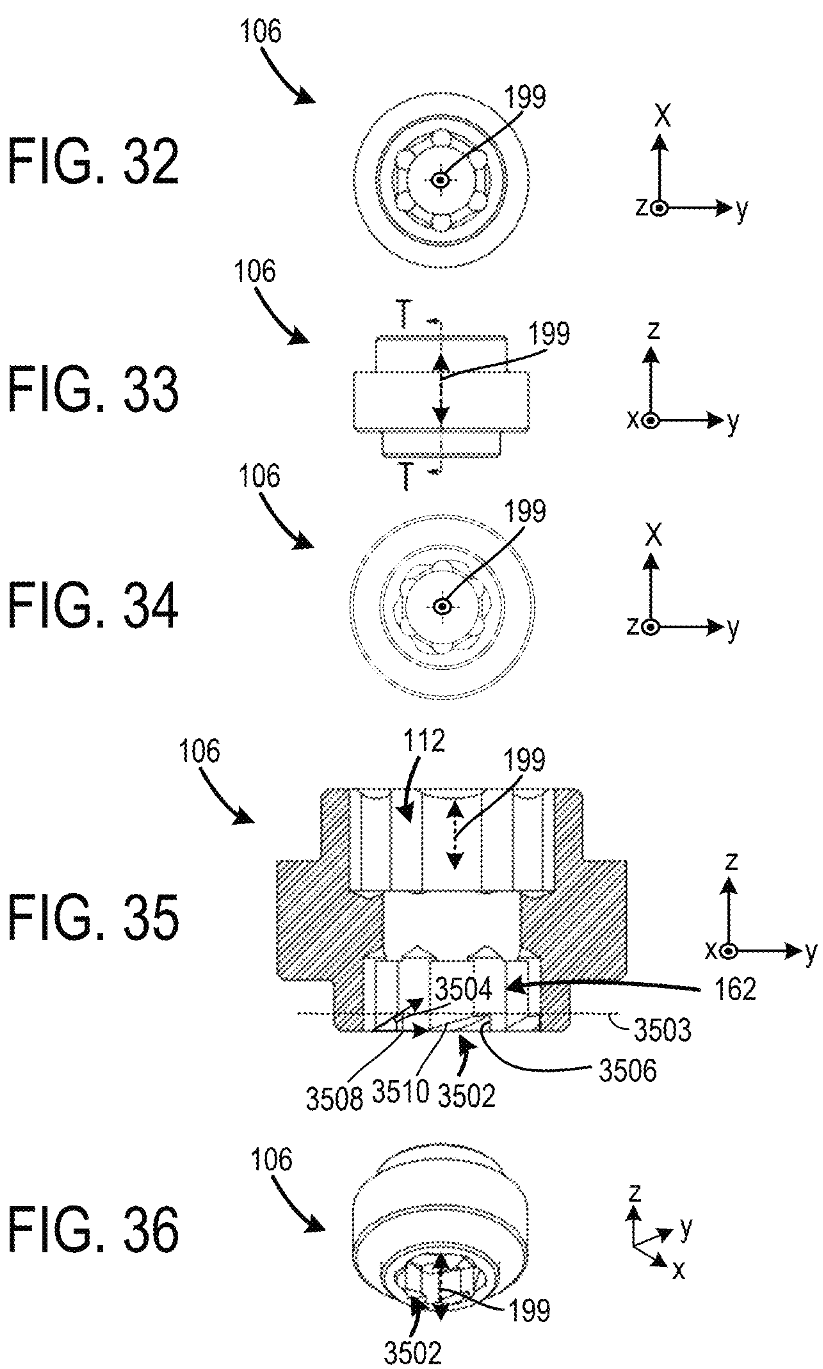
FIGS. 32-36 are different detailed views of a drive nut in the fastener, depicted in FIG. 1.

Ramped surfaces 3502 (also referred to as ramps) of the drive nut 106 are specifically illustrated in FIGS. 35-36. The ramped surfaces 3502 function to push the drive nut off of screw head when driven clockwise beyond the fastener's target clamp force. In this way, the screw head is pushed out of the drive nut's polygonal recess 162 when the clutch mechanism disengages due to fastener over torqueing. A transition point 3503 between the full polygonal engagement and the direction polygonal engagement between the drive nut 106 and the screw head is indicated in FIG. 35. The ramped surfaces may be equally spaced about the fastener's central axis 199. Alternatively, the fastener's clutch mechanism may be configured as a drive nut without ramps that engages a screw in the install direction. In this clutch mechanism example, the screw will compress the spring, providing clamp force, until it disengages with the drive nut, making it impossible to further increase the clamp force. In order to uninstall the fastener with the drive nut that does not have ramps, one can directly access the screw through the drive nut and unwind it directly releasing the clamp and repositioning the fastener and drive nut in the install direction.

An angle 3504 of one of the ramped surfaces 3502 with regard to a horizontal axis is indicated in FIG. 35. The angle 3504 may be in the range of 20°-60°, in one example. Specifically, in one example, the angle 3504 may be in the range between 25°-35°.

The ramped surfaces 3502 each specifically include an angled surface 3506 that forms the angle 3504 with a horizontal axis 3508 and a vertical surface 3510 in the illustrated example. In this way, the drive nut uni-directionally slips off of the screw head. It will be appreciated that the horizontal axis 3508 is perpendicular to a vertical axis.

Figures 37, 38, 39, 40:
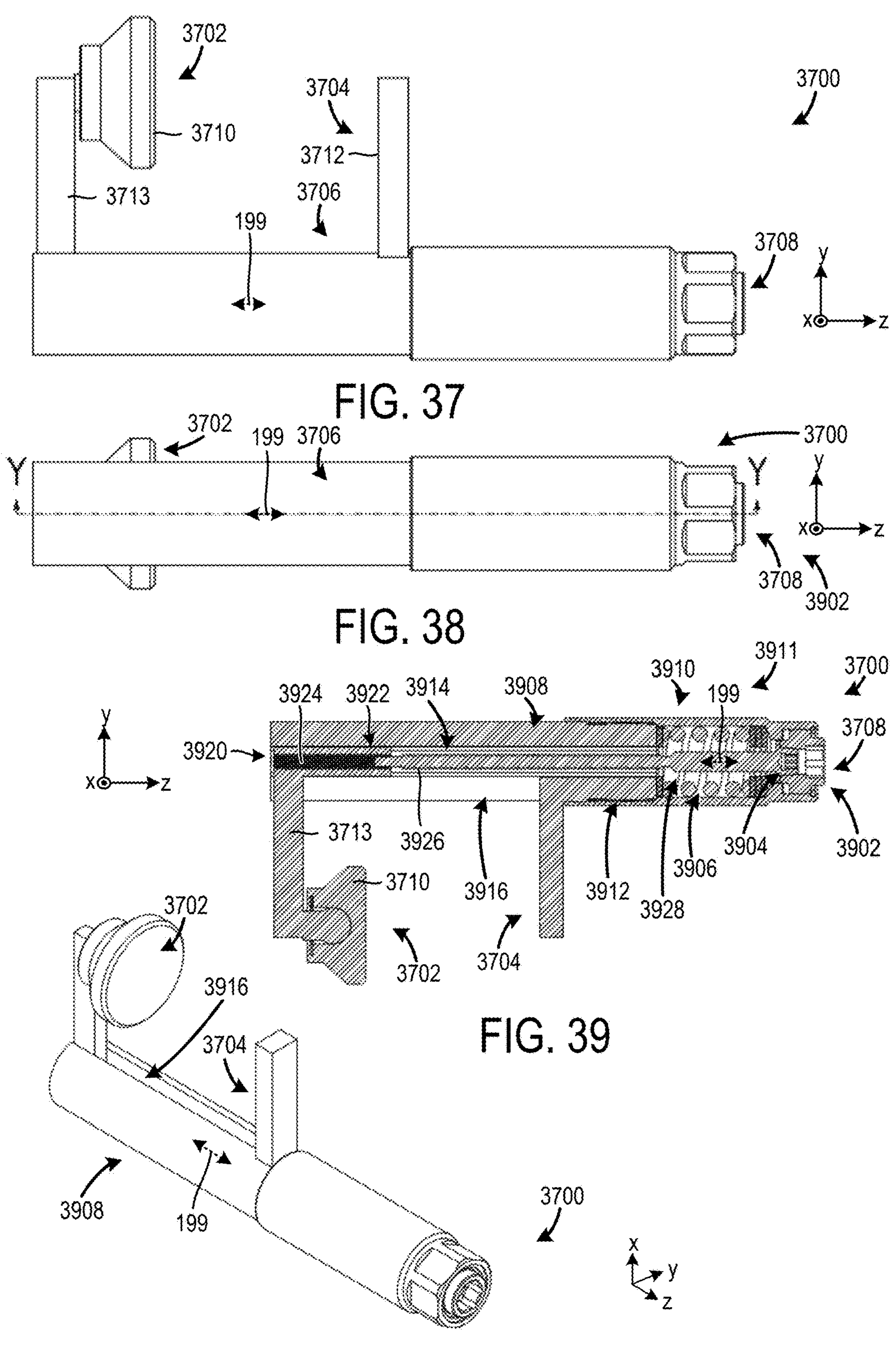
FIGS. 37-40 are different views of another example of a fastener.

FIGS. 37-38 show another example of a fastener 3700 with a movable clamping jaw 3702 and a fixed clamping jaw 3704 that is included in and extends radially outward from a housing section 3706 (e.g., a lower housing section). Movable clamping jaw 3702 includes a clamping surface 3710 (e.g., a horizontally arranged surface) and the fixed clamping jaw 3704 similarly includes a clamping surface 3712 (e.g., a horizontally arranged surface). As such, the clamping jaws extend radially outward from the fastener in the illustrated example. However, other clamping jaw configurations are possible. Further, in the illustrated example, the movable clamping jaw 3702 includes an arm 3713 that radially extends outward.

The fastener 3700 further includes a drive nut 3708. The fastener 3700 shown in FIGS. 37 and 38 has a clutch mechanism 3902 (with regard to structure and function) as the previously described fasteners. As such, redundant description of the clutch mechanism is omitted for brevity. Cutting plane Y-Y defines the cross-sectional view shown in FIG. 39.

FIG. 39 shows the fastener 3700 with the clutch mechanism 3902 that includes the drive nut 3708 that mates with a screw head 3904 when the mechanism is engaged as well as a spring and washer/shim assembly 3906. The fastener 3700 further includes a plug 3908 that is coupled to a housing body 3910 to form a housing 3911. Specifically, the plug 3908 is threaded into an interior of the housing body 3910 as indicated at 3912. As such, the plug 3908 may be referred to as a threaded plug, in the illustrated example. However, in other examples, the plug may be friction fit with the housing body. The plug 3908 includes a bore 3914. A portion of the movable clamping jaw 3702 mates with the bore 3914 such that the clamping jaw is able to axially translate without rotation when the fastener is clamped and unclamped. The bore and the movable clamping jaw may therefore form a polygonal interface. The plug 3908 includes a slot 3916 that allows the movable clamping jaw 3702 to axially translate during fastener clamping and unclamping.

The movable clamping jaw 3702 and the fixed clamping jaw 3704 are again depicted in FIG. 39. To elaborate, the arm 3713 and the clamping surface 3710 of the movable clamping jaw 3702 are again depicted. Further, in the illustrated example, the movable clamping jaw 3702 includes a section 3920 that includes an outer surface 3922 (e.g., outer polygonal surface) that mates with the bore 3914. The section 3920 further includes an inner threaded section 3924 that threadingly engages a threaded section 3926 of a screw 3928 during fastener clamping/unclamping operation. Thus, when the fastener is in a ready to clamp configuration, rotation of the screw 3928 causes the movable clamping jaw 3702 to axially translate without rotation. In this way, the fastener is able to be efficiently clamped and unclamped. The fixed clamping jaw 3704 and the movable clamping jaw 3702 are offset from the central axis 199, in the illustrated example.

FIG. 40 shows a perspective view of the fastener 3700 with the slot 3916 in the plug 3908. It will be understood that the slot extends from an inner diameter of the plug to an outer diameter of the plug. The movable clamping jaw 3702 and the fixed clamping jaw 3704 are again depicted in FIG. 40. The movable clamping jaw 3702 is in the form of an upper clamping jaw and the fixed clamping jaw 3704 is in the form of a lower clamping jaw in the illustrated example. However, other clamping jaw architectures are possible.

FIGS. 41-42 show another example of a fastener 4100. Cutting plane A-A, depicted in FIG. 41, defines the cross-sectional view shown in FIG. 42. The fastener 4100 includes a movable clamping jaw 4102 and a fixed clamping jaw 4104. In the illustrated example, the movable clamping jaw 4102 is formed as an upper clamping jaw and the fixed clamping jaw 4104 is formed as a lower clamping jaw. The fixed clamping jaw 4104 is coupled to a housing 4228. To elaborate, the fixed clamping jaw 4104 includes an arm 4106 that is coupled to a housing body 4214. The arm 4106 specifically extends axially downward and then radially inward in the illustrated example. In this way, the clamping surfaces in the fastener may be aligned with the central axis 199. However, a The fastener 4100 depicted in FIGS. 41-42 includes a clutch mechanism 4200 that is in an engaged configuration. The clutch mechanism 4200 includes a drive nut 4202 with a bore the mates with a head 4204 of the screw 4206 in an engaged configuration. The screw 4206 includes a flange 4208 that axially delimits a lower side of a spring and washer/shim assembly 4210. A step 4212 in a housing body 4214 axially constrains the upper side of the spring and washer/shim assembly 4210. The clutch mechanism 4200 is flipped to operate in the opposite direction as the previously described clutch mechanisms. The spring in the spring and washer/shim assembly 4210 provides constant pressure on the drive nut that is provided by the external drive bit in the non-flipped clutch mechanism.

The movable clamping jaw 4102 includes a threaded section 4220 that threadingly engages a threaded section 4222 of the screw 4206. Further, the movable clamping jaw 4102 includes a polygonal outer surface 4223 that mates with a bore 4224 in a plug 4226 of a housing 4228. The plug 4226 is threadingly engaged with the housing body 4214 to form the housing 4228. The movable clamping jaw 4102 includes a clamping surface 4240 and the fixed clamping jaw 4104 similarly includes a clamping surface 4242.

FIGS. 43-44 show the fastener 4100 with the clutch mechanism 4200 in a disengaged configuration. Cutting plane B-B, depicted in FIG. 43, defines the cross-sectional view shown in FIG. 44. The clamp force pushes the screw head 4204 back against spring (rather than pulling it forward) and disengages the clutch mechanism 4200 much like in non-flipped clutch mechanisms.

Figure 45:
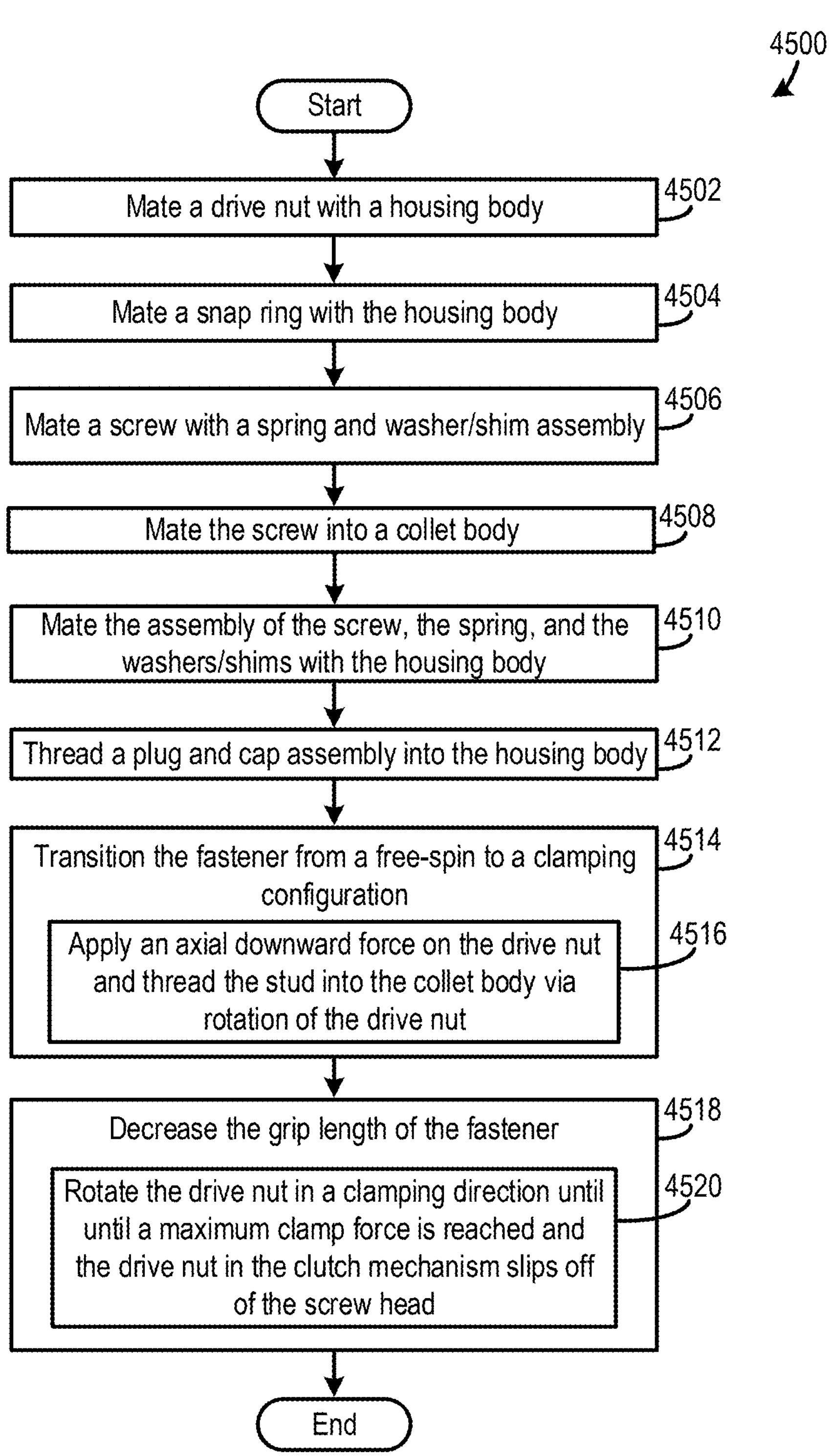
FIG. 45 is a method for operation of a fastener.

FIG. 45 shows a method 4500 for assembly and operation of a fastener. The method may be implemented by any of the fasteners and tooling apparatuses or combinations of the fasteners and tooling apparatuses described above with regard to FIGS. 1-44. However, in other examples, the method may be implemented by other suitable fastener systems and/or tooling apparatuses. Still further, at least a portion of the method steps may be manually implemented via manufacturing personnel, in some instances.

At 4502, the method includes mating a drive nut with a housing body. Next at 4504, the method includes mating a snap ring with the housing body. In this way, the drive nut is axially retained within the housing body.

At 4506, the method includes mating a screw with a spring and washer/shim assembly. Next at 4508, the method includes mating the screw with a collet body.

At 4510, the method includes mating the assembly of the screw, the spring, and the washers/shims with the housing body. At 4512, the method includes threading (or otherwise attaching) a plug and cap assembly into the housing body.

At 4514, the method includes transitioning the fastener from a free-spin to a clamping configuration which includes sub-step 4516 where the method includes applying an axial downward force on the drive nut and threading the stud into the collet body via rotation of the drive nut.

At 4518, the method includes decreasing the grip length of the fastener which includes step 4520 where the method includes rotating the drive nut in a clamping direction until a maximum clamp force is reached and the drive nut in the clutch mechanism slips off of the screw head in response to rotation of the drive nut in the clamping direction. The method may further include unclamping the fastener via rotation of the drive nut in the unclamping direction until the fastener transitions into the free-spin configuration where the reduced diameter section of the screw aligns with the threaded section of the collet body. Method 4500 allows the fastener to be efficiently clamped until a maximum clamp force is reached to reduce the chance of (e.g., avoid) workpiece degradation.

FIGS. 1-44 and 46-47 are drawn approximately to scale, aside from the schematically depicted components. However, other relative component dimensions may be used, in other embodiments.

FIGS. 1-44 and 46-47 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. An elements inner and outer diameter may be referred to as such. Further an element with a smaller or greater diameter than another element may be referred to as such.

The invention will be further described in the following paragraphs. In one aspect, a fastener is provided that comprises a clutch mechanism configured to transition to a disengaged configuration responsive to a clamping force of the fastener exceeding a threshold value; wherein the clutch mechanism comprises: a drive nut that is configured to mate with a head of a screw in an engaged configuration; a spring configured to interact with the screw head; and a clamping assembly that includes: a movable clamping jaw; and a fixed clamping jaw coupled to a housing; wherein rotation of the screw causes axially translation of the movable clamping jaw; and wherein in the disengaged configuration of the clutch mechanism, rotation of the drive nut in a first direction does not induce rotation of the screw and rotation of the drive nut in a second direction induces rotation of the screw in an unclamping direction. In one example, the drive nut may include multiple ramps with angled surface that are configured to slip off of the head of the screw when the head compresses the spring in the clutch mechanism by a threshold amount. In another example, the spring may include a helical spring, a Belleville spring, a wave spring, and/or a polymer spring. In another example, the angled surface may have an angle between 20° and 60° in relation to a horizontal axis. In yet another example, the clutch mechanism may include a retaining ring that is mated with a housing and configured to axially delimit the drive nut. In another example, the fixed clamping jaw may be an upper clamping jaw and the movable clamping jaw is a lower clamping jaw. In another example, the movable clamping jaw may be an upper clamping jaw and the fixed clamping jaw is a lower clamping jaw. In yet another example, the housing may include a threaded plug and a cap that mate with a body; and the threaded plug may include a polygonal bore that mates with a polygonal section of the movable clamping jaw. In another example, the screw may include a free-spin section that is configured to disengage from a threaded section of the movable clamping jaw in response to rotation of the drive nut in the second direction beyond a threshold amount. In another example, the drive nut may include a flange mated in a recess of a housing. In another example, the drive nut may include a polygonal bore and the screw head has a polygonal shape.

In another aspect, a method for operating a fastener is provided that comprises rotating a drive nut in a clamping direction to increase a clamping force exerted on a workpiece stack by the fastener; and rotating the drive nut in the clamping direction to transition a clutch mechanism into a disengaged configuration responsive to a clamping force of the fastener exceeding a threshold value; wherein the fastener comprises: the clutch mechanism that comprises: the drive nut configured to mate with a head of a screw in an engaged configuration; and a spring; and a clamping assembly that includes: a movable clamping jaw; and a fixed clamping jaw coupled to a housing. In one example, the method may further comprise rotating the drive nut in an unclamping direction to decrease the clamping force exerted on the workpiece stack. In another example, the fixed clamping jaw may be an upper clamping jaw and the movable clamping jaw may be a lower clamping jaw. In another example, the movable clamping jaw may be an upper clamping jaw and the fixed clamping jaw may be a lower clamping jaw. In another example, the drive nut may include ramps with angled surface that are configured to slip off of the head of the screw when the head compresses a spring in the clutch mechanism is compressed by a threshold amount.

In another aspect, a fastener system is provided that comprises a clutch mechanism comprising: a drive nut configured to mate with a head of a screw in an engaged configuration; and a spring configured to interact with the screw head; and wherein the drive nut includes multiple ramps that are configured to disengaged the drive nut from the screw head in response to a clamping force of the fastener exceeding a threshold value; and a clamping assembly that includes: a movable clamping jaw including a threaded section that threadingly engages a threaded section of the screw; and a fixed clamping jaw coupled to a housing. In one example, the fastener may further comprise a retaining ring that mates with the housing, wherein the drive nut includes a flange mated in a recess of the housing and wherein the retaining ring and the housing recess axially delimits the flange of the drive nut. In another example, the housing may include a threaded plug and a cap that mate with a body; and the threaded plug may include a polygonal bore that mates with a polygonal section of the movable clamping jaw. In yet another example, the plug may be interference fit with the threaded cap.

Note that the example control and estimation routines included herein can be used with various fastener configurations. The control methods and routines disclosed herein may be stored as executable instructions in non-transitory memory and may be carried out by a tooling apparatus. However, it will be appreciated that at least a portion of the method steps may be manually implemented via installation personnel.

The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the fastener and/or tooling apparatus, where the described actions are carried out by executing the instructions in a tooling apparatus and a fastener which includes various components.

It will be appreciated that the configurations and routines disclosed herein are exemplary in nature, and that these specific embodiments are not to be considered in a limiting sense, because numerous variations are possible. For example, the above technology can be applied to a broad range of manufacturing fields such as the aerospace industry, the construction industry, the maritime industry, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fastener, comprising:

a clutch mechanism configured to transition to a disengaged configuration responsive to a clamping force of the fastener exceeding a threshold value;

wherein the clutch mechanism comprises:

a drive nut that is configured to mate with a head of a screw in an engaged configuration;

a spring configured to interact with the screw head; and a clamping assembly that includes:

a movable clamping jaw; and a fixed clamping jaw coupled to a housing;

wherein rotation of the screw causes axially translation of the movable clamping jaw; and wherein in the disengaged configuration of the clutch mechanism, rotation of the drive nut in a first direction does not induce rotation of the screw and rotation of the drive nut in a second direction induces rotation of the screw in an unclamping direction.

2. The fastener of claim 1, wherein the drive nut includes multiple ramps with angled surface that are configured to slip off of the head of the screw when the head compresses the spring in the clutch mechanism by a threshold amount.

3. The fastener of claim 2, wherein the spring includes a helical spring, a Belleville spring, a wave spring, and/or a polymer spring.

4. The fastener of claim 2, wherein the angled surface has an angle between 20° and 60° in relation to a horizontal axis.

5. The fastener of claim 1, wherein the clutch mechanism includes a retaining ring that is mated with a housing and configured to axially delimit the drive nut.

6. The fastener of claim 1, wherein the fixed clamping jaw is an upper clamping jaw and the movable clamping jaw is a lower clamping jaw.

7. The fastener of claim 1, wherein the movable clamping jaw is an upper clamping jaw and the fixed clamping jaw is a lower clamping jaw.

8. The fastener of claim 1, wherein:

the housing includes a threaded plug and a cap that mate with a body; and the threaded plug includes a polygonal bore that mates with a polygonal section of the movable clamping jaw.

9. The fastener of claim 1, wherein the screw includes a free-spin section that is configured to disengage from a threaded section of the movable clamping jaw in response to rotation of the drive nut in the second direction beyond a threshold amount.

10. The fastener of claim 1, wherein the drive nut includes a flange mated in a recess of a housing.

11. The fastener of claim 1, wherein the drive nut includes a polygonal bore and the screw head has a polygonal shape.

* * * * *